United States Patent [19]

Happich et al.

[11] Patent Number: 5,061,004
[45] Date of Patent: Oct. 29, 1991

[54] VEHICLE SUN VISOR WITH REVERSIBLE MIRROR

[75] Inventors: Otto Happich; Kurt Cziptschirsch, both of Wuppertal, Fed. Rep. of Germany

[73] Assignee: Gebr. Happich GmbH, Fed. Rep. of Germany

[21] Appl. No.: 650,487

[22] Filed: Feb. 5, 1991

[30] Foreign Application Priority Data

Mar. 7, 1990 [DE] Fed. Rep. of Germany ....... 4007185

[51] Int. Cl.⁵ .............................................. B60J 3/02
[52] U.S. Cl. .................................... 296/97.5; 359/872
[58] Field of Search ............................ 296/97.5, 97.1; 362/135, 142, 144; 350/632, 633

[56]  References Cited

U.S. PATENT DOCUMENTS

| 4,068,930 | 1/1978 | Marcus | 296/97.5 |
| 4,541,663 | 9/1985 | Schwanitz et al. | 296/97.5 |
| 4,624,499 | 11/1986 | Flowerday | 296/97.5 |
| 4,635,994 | 1/1987 | Dietz et al. | 296/97.5 |
| 4,652,982 | 3/1987 | Flowerday | 296/97.5 |

FOREIGN PATENT DOCUMENTS 3404735 8/1985 Fed. Rep. of Germany .
3727455 3/1989 Fed. Rep. of Germany .

Primary Examiner—Robert R. Song
Attorney, Agent, or Firm—Ostrolenk, Faber, Gerb & Soffen

[57] ABSTRACT

A sun visor with a reversible mirror. The visor body has a recess in a wide side of the sun visor body. A trough-shaped housing is arranged in the recess. A reversibly mounted mirror is received in the housing. A yoke comprising two arms and a cross arm is mounted for swinging around the cross arm and lies flat in the housing closely adjacent to three adjoining housing walls. The yoke is swingable away from the housing bottom against the restoring force of a spring means acting on the yoke arms. The mirror is mounted for turning between the arms of the yoke.

12 Claims, 3 Drawing Sheets

VEHICLE SUN VISOR WITH REVERSIBLE MIRROR

BACKGROUND OF THE INVENTION

The present invention relates to a sun visor, in particular for motor vehicles, having a sun visor body, a recess in one wide side of the sun visor body, a trough-shaped housing arranged in the recess, and a reversibly mounted mirror received in the housing.

A sun visor of this type is known from Federal Republic of Germany Published Application OS 34 04 735, which corresponds to U.S. Pat. No. 4,635,994. In that known sun visor, the mirror is swingable around one of its edges and is displaceable in a direction perpendicular to the edge in the plane of the mirror and is thus arranged reversibly on the sun visor. This development is intended to create a sun visor having a coverable mirror in which the mirror retains the same arrangement on the sun visor, for instance a central arrangement, both in the covered and uncovered positions. It is no longer required to bring elements over the mirror in order to cover it.

SUMMARY OF THE INVENTION

The object of the present invention is to improve the aforementioned type of sun visor with respect to its handling for turning the mirror around.

To achieve this purpose, there is a yoke within the housing for the mirror. The yoke has two side arms and a joining cross arm. The yoke is mounted in the housing for swinging around its cross arm. The yoke lies along with the mirror flat in a housing recess. The yoke is adjacent the three adjoining housing walls. The yoke is adapted to be swung away from the bottom of the housing, against the restoring force of spring means. The mirror is mounted for rotation between the side arms of the yoke.

The invention produces a sun visor in which the mirror can be turned, in a particularly user friendly manner, in order to hide either the front side of the mirror or the rear side of the mirror, as desired. In general, the reflective front side of the mirror may lie flat on and parallel to the bottom of the housing hidden inside the housing so that there is no danger of dazzling from the mirror. Only when the mirror is to be used, for instance as make-up mirror, is the front side of the mirror made accessible to the view of the observer by turning the mirror around. The mirror can be turned by grasping the mirror on its edge that is opposite the cross arm of the yoke and by pulling the mirror away from the bottom of the housing. The yoke is at the same time swung upward out of the housing to such an extent that the mirror can be freely rotated between the arms of the yoke. That edge of the mirror which was originally adjacent the cross arm of the yoke slides against the wall of the housing opposite the cross arm of the yoke. The mirror can be turned using one finger of one hand of a person.

The upward swinging of the mirror and of the yoke are effected against the restoring force of spring means until the mirror has passed beyond the perpendicular to the bottom of the housing. When the mirror swings beyond the perpendicular, this passes beyond dead center position. The spring means now urges the mirror, now in its reversed position, into a position in which it again rests flat on the bottom of the housing.

Regardless of whether the mirror is to be swung downward, upward, from right to left or from left to right, the invention can be developed in such a manner that the wishes of the customer can be accommodated.

The mirror is preferably pivotally attached to the arms of the yoke, and is turnable around its longitudinal center line. In this way, the smallest amount of space is required for turning the mirror.

The mirror may be framed by the yoke over about half the periphery of the mirror. The axis of rotation between the mirror and the yoke is then advantageously arranged at the region of the free ends of the yoke arms.

In another development of the invention, the mirror is developed integrally with a rearwardly extending cover around it, which also surrounds the cover and extends over its edge. The cover has pivot pins or pin-receivers for turnable connection to the arms of the yoke. This serves for aesthetic purposes. But, it also facilitates the manufacture and installation of the pivot connection.

Installation is facilitated if the yoke is developed, along the extension of its cross arm, with pivot pins which can be introduced, for instance by clip mounting, into mounting lugs provided on the housing.

In a further development of the invention, the yoke is provided with spring means comprising at least one restoring spring which is tensioned upon the upward swinging of the yoke and which urges the arms of the yoke continuously in the direction toward lying flat on the bottom of housing. The restoring spring may suitably be a torsion spring developed, for instance, as a coil spring, which is seated on at least one pivot pin of the yoke, and the end of the spring acts on one arm of the yoke. For uniform loading, the use of two storing springs is advisable, with one spring being associated with each arm of the yoke.

The good appearance of the sun visor can be optimized by providing the housing with a filling frame which completes the frame around the mirror by supplementing the framing of the mirror by the yoke and forming a continuous frame. If the housing, as is preferred, is formed of a plastic injection molding, such a filling frame can also be developed integral thereon in a cost favorable manner.

In order to be able to use the mirror or the sun visor even in the dark, it is possible, in accordance with another preferred development of the invention, for the visor body or for the mirror housing to be provided with at least one additional housing which widens to receive an electric illuminating device.

Other objects and features of the invention are described with reference to one embodiment of the invention, described in further detail with reference to the drawings.

DESCRIPTION OF A PREFERRED EMBODIMENT

Figure 1:
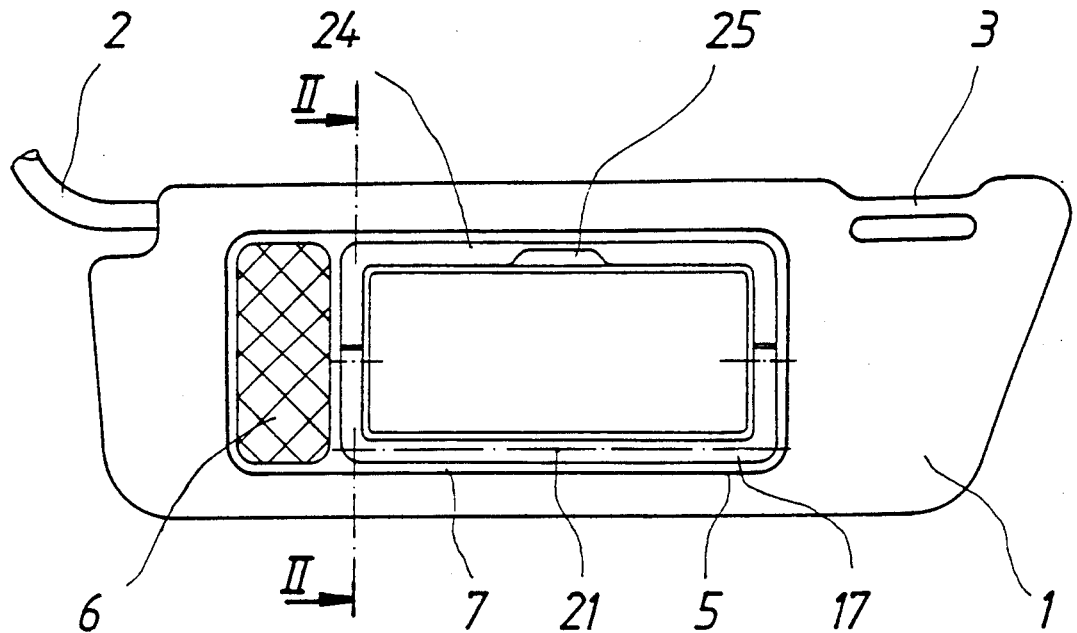
FIG. 1 is a front view of a motor vehicle sun visor.
Figure 2:
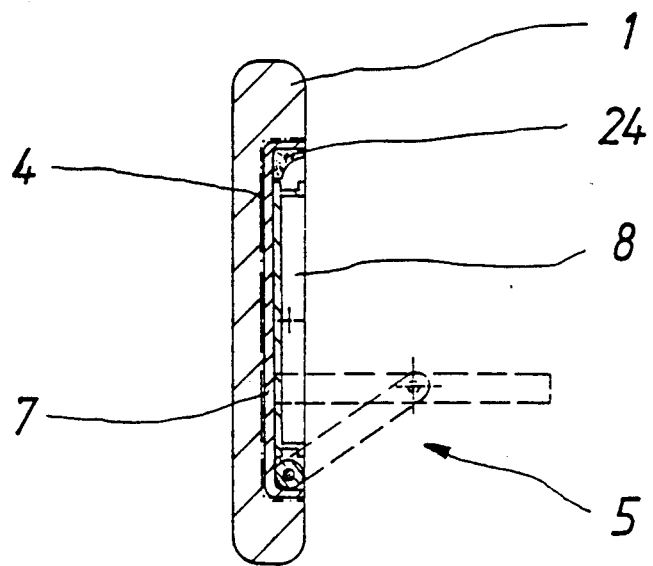
FIG. 2 is a section approximately along the line II—II of FIG. 1.
Figure 3:
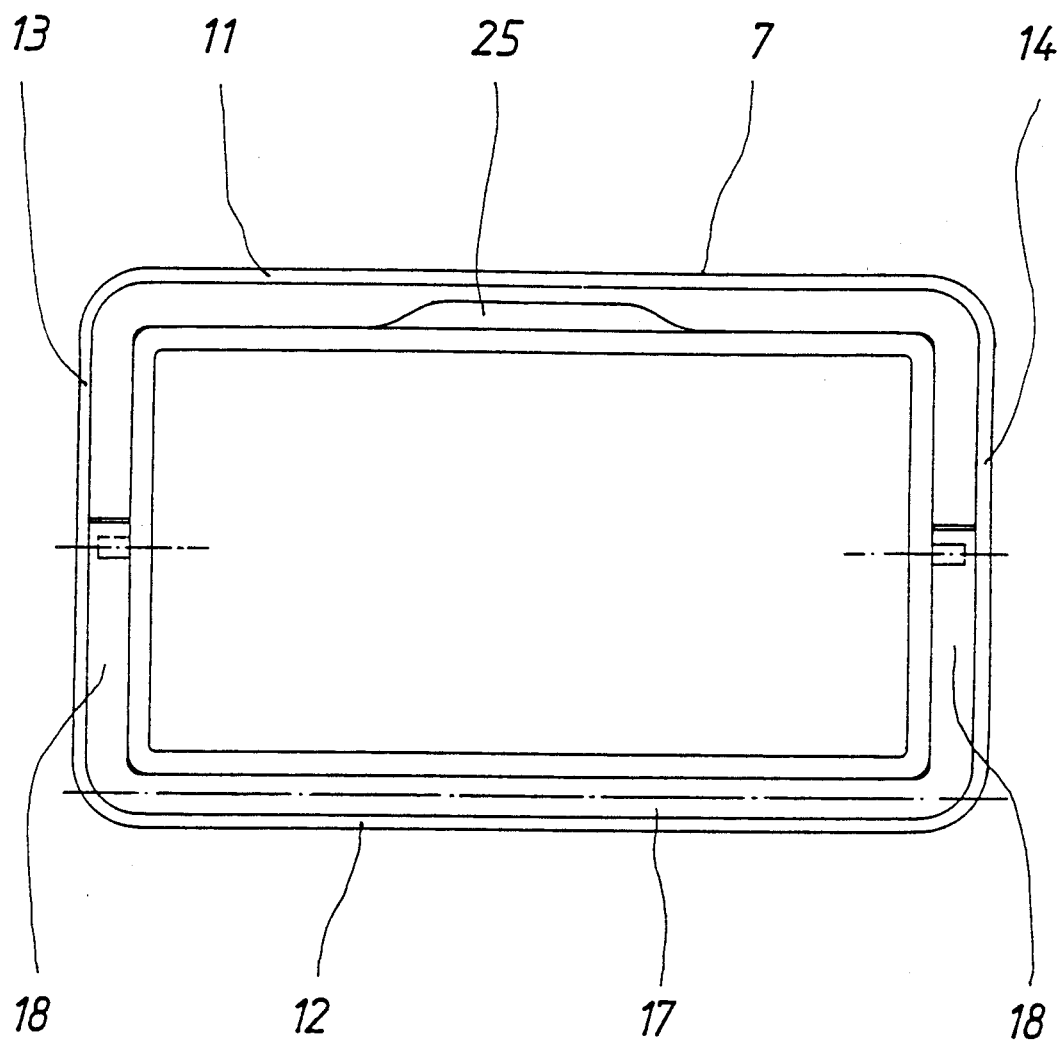
FIG. 3 shows a mirror assembly.
Figure 4:
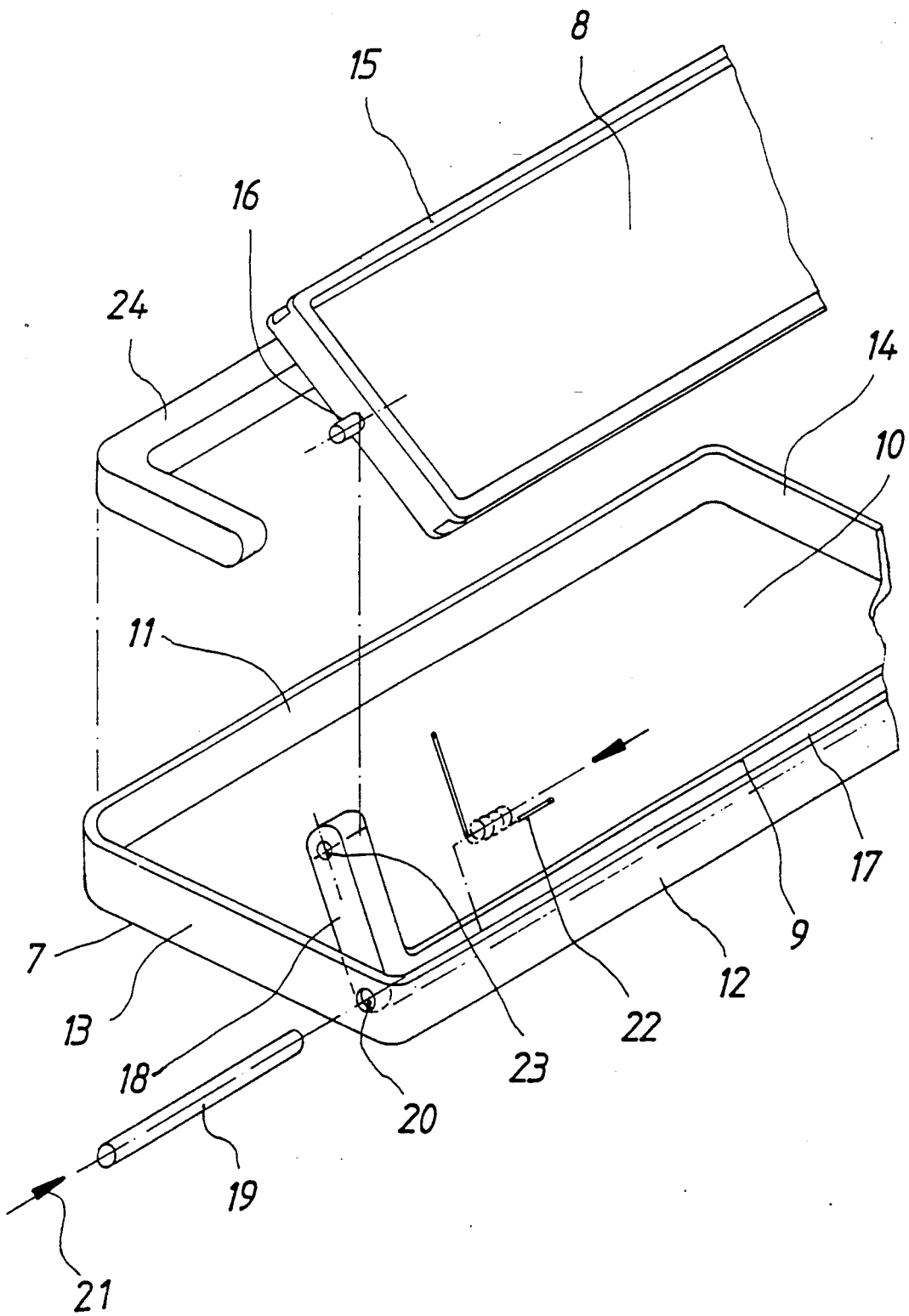
FIG. 4 shows the mirror assembly in a diagrammatic exploded view.

FIGS. 1 and 2 show a motor-vehicle sun visor. It includes a sun visor body 1. In the region of its upper longitudinal edge, the body 1 has a sun visor shaft 2 which is inserted in the sun visor body 1. A pivot pin 3 is formed at the upper edge at the side away from the shaft 2. The sun visor body 1 has an open recess 4 on one of its wide, flat sides to receive a mirror assembly 5. The mirror assembly 5 usually also includes an illuminating device 6 which is arranged in the sun visor body 1, as shown in FIG. 1. The illuminating device can be arranged on the left and/or right alongside the mirror, above and/or below it and that device can obtain its electricity from the electrical system of the motor vehicle, in a known manner.

The mirror assembly comprises a housing 7 which is inserted into the recess 4 in the sun visor body 1, a mirror 8 which is received by the housing 7, and a yoke 9 received by the housing 7. In the embodiment shown, the housing 7 is of rectangular shape and has a bottom 10, an upper housing wall 11 (upper with reference to the top of the visor body), a lower housing wall 12, and two opposite housing side walls 13 and 14. The housing 7 may be developed as a plastic injection molding.

The mirror 8, which is of rectangular shape in the same way as the housing 7, is provided with a rear cover 15 which also surrounds its edge and which comprises a plastic injection molding. The cover 15 has pivot pins 16 which are arranged at the longitudinal axis of symmetry and which protrude laterally toward the outside. The pins can be developed integral with and be of the same material as the cover.

The yoke 9 may be formed of a plastic injection molding. The yoke comprises a cross arm 17 which joins two parallel side arms 18 at the ends of the cross arm. The yoke 9 is normally arranged flat within the housing 7 and, in this connection, it is adjacent three adjoining housing walls 12, 13, 14. In particular, the yoke 9 is mounted for swinging in the housing around its cross arm 17. For that purpose, a shaft 19 passes through the cross arm 17 over its entire length, or journal pins (not shown) protrude from the ends of the cross arm. The journal pins or the ends of the shaft 19 engage in mounting holes 20 which are provided in the opposite housing side walls 13, 14 so that the yoke 9 can be swung upward around the axis of swing 21 and away from the housing bottom 10. At least one torsion spring 22 having one end which rests against the cross arm 17 and the other end which rests against an arm 18, continuously urges the arms 18 of the yoke 9 to swing in the direction toward the bottom 10 of the housing 7. The region of the free ends of the arm 18 of the yoke 9 has mounting holes 23 to receive the pivot pins 16 of the mirror rear cover 15. This mounts the mirror 8 for free turning between the arms 18 of the yoke 9.

Mostly for reasons of symmetry and for pleasing appearance, the mirror 8 and/or mirror cover 15 are framed, over approximately more than half of their periphery, by the yoke 9 and are further framed by a filling frame 24 the shape of which is adapted to that of the yoke. The filling frame 24 can be produced as a separate part or else can be integral with the housing 7. In the central region of the cross arm of the filling frame, a cut-out 25 serves as a grip opening for turning the mirror around.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

We claim:

1. A sun visor for a motor vehicle, comprising:

a sun visor body having opposite wide flat sides, a recess defined in one of the flat sides of the visor body; a generally trough-shaped housing in the recess, the housing being open facing out of the flat side of the visor body;

a reversible mirror mounted in the housing, the mirror having a front side and a rear side, the mirror having opposite lateral sides;

a yoke in the housing recess, the yoke comprising two spaced apart side arms passing by the opposite lateral sides of the mirror, and a cross arm joining the two yoke side arms; means mounting the cross arm in the housing for pivoting generally around the axis of the cross arm for enabling the two side arms to be swung away from the housing;

the mirror being mounted between the side arms for being turnable with respect to the side arms so that one of the front and rear sides of the mirror may be turned to face outward when the yoke arms have been swung out of the housing.

2. The sun visor of claim 1, further comprising spring means connected with the yoke for urging the yoke into the housing.

3. The sun visor of claim 2, wherein the yoke lies flat in the housing and the mirror lies flat in the housing with one side thereof facing outwardly.

4. The sun visor of claim 3, wherein the mirror is mounted in an articulated manner to the side arms of the yoke to rotate about the longitudinal center line of the mirror.

5. The sun visor of claim 1, wherein the yoke side arms and cross arm frame around approximately one-half the periphery of the mirror.

6. The sun visor of claim 1, further comprising a rear cover extending rearward back from the mirror, and the cover surrounding the peripheral edge of the mirror; the mounting of the mirror to the yoke arms for turning comprises a pivot pin connection between the yoke arms and the rear cover enabling the mirror to turn about the pivot pins.

7. The sun visor of claim 6, wherein the means mounting the cross arm for pivoting comprises pivot pins projecting from the ends of the yoke cross arm, mounting holes provided in the housing for receiving the pivot pins of the cross arm, whereby the yoke may pivot around the cross arm pivot pins.

8. The sun visor of claim 1, wherein the means mounting the cross arm for pivoting comprises pivot pins projecting from the ends of the yoke cross arm, mounting holes provided in the housing for receiving the pivot pins of the cross arm, whereby the yoke may pivot around the cross arm pivot pins.

9. The sun visor of claim 2, wherein the spring means comprises at least one restoring spring in engagement with the yoke for continuously urging the yoke side arms in the direction toward the bottom of the housing.

10. The sun visor of claim 5, further comprising a filling frame in the housing for supplementing the framing of the mirror by the yoke and extending around the periphery of the frame where the yoke does not extend.

11. The sun visor of claim 1, wherein the yoke partially surrounds and frames part of the periphery of the mirror;

a filling frame in the housing for supplementing the framing of the mirror by the yoke and extending around the remaining periphery of the mirror.

12. The sun visor of claim 1, further comprising the housing having at least one widened region to one side of the mirror for receiving an electric illuminating device.

* * * * *